United States Patent [19]

Acquaviva

[11] Patent Number: 5,585,703
[45] Date of Patent: Dec. 17, 1996

[54] METHOD AND SYSTEM FOR CONTROLLING A BRUSHLESS ELECTRIC MOTOR FOR OPTIMAL COMMUTATION OVER A WIDE SPEED RANGE

[75] Inventor: Sebastiano Acquaviva, Pino Torinese, Italy

[73] Assignee: United Technologies Motor Systems, Inc., Columbus, Miss.

[21] Appl. No.: 314,995

[22] Filed: Sep. 29, 1994

[30] Foreign Application Priority Data

Sep. 30, 1993 [IT] Italy ................... TO9300715

[51] Int. Cl.$^6$ ........................................ H02P 7/00
[52] U.S. Cl. ............................ 318/439; 318/254
[58] Field of Search ....................... 318/254, 138, 318/437

[56] References Cited

U.S. PATENT DOCUMENTS

| | | | |
|---|---|---|---|
| 4,712,050 | 12/1987 | Nagasawa et al. | 318/254 |
| 4,733,118 | 3/1988 | Mihalko . | |
| 4,743,815 | 5/1988 | Gee et al. | 318/254 |
| 4,780,651 | 10/1988 | Nakano et al. | 318/254 |
| 4,912,378 | 3/1990 | Vukosavic | 318/254 |
| 4,983,894 | 1/1991 | Oku et al. | 318/138 |
| 5,130,620 | 7/1992 | Inaji et al. . | |
| 5,202,616 | 4/1993 | Peters et al. . | |

FOREIGN PATENT DOCUMENTS 2251989 7/1992 United Kingdom .

*Primary Examiner*—Jonathan Wysocki
*Attorney, Agent, or Firm*—William W. Habelt

[57] ABSTRACT

A method and system is provided for controlling the operation of a brushless electric motor of the type having at least two phase windings, each of the phase windings being connected in series with a respective switch to form a respective circuit branch between the terminals of a constant voltage source thereby forming a plurality of said circuit branches in parallel to each other. A plurality of signals, each signal indicative of the electromotive force developed in a respective one of the phase windings during operation of the motor, is generated and compared with a predetermined reference value so as to generate synchronization logic signal. A control signal indicative of the angular rotor position of the motor is generated using the synchronization signal and compared with a first and a second reference signal for generating respective processing signals for controlling the current flow in each said respective circuit branch. The reference signals may be varied so as to modify the time of initiating the flow of current and ceasing the flow of current in the respective phases.

6 Claims, 3 Drawing Sheets

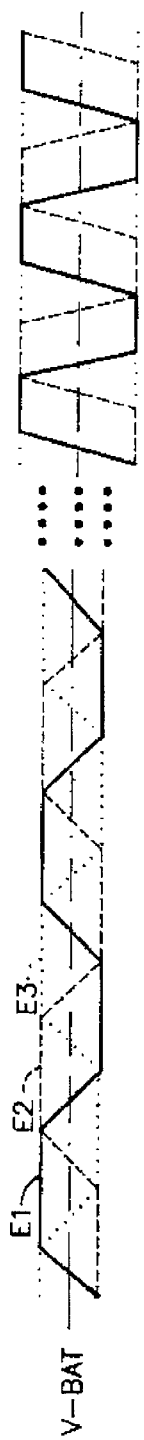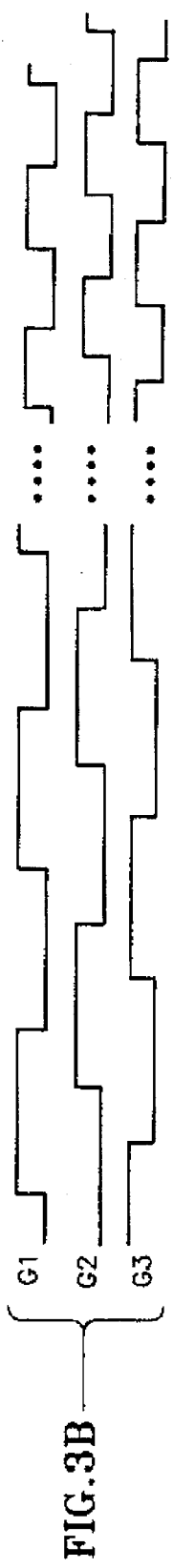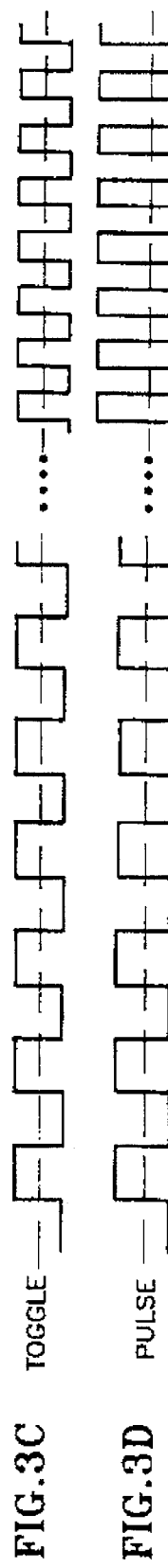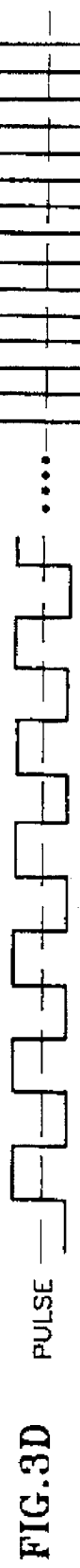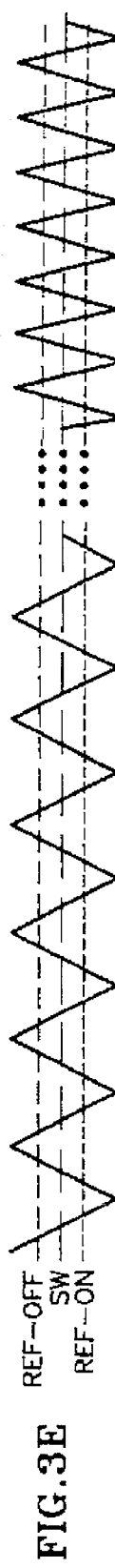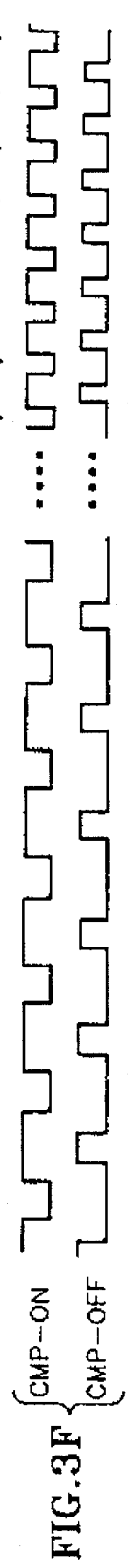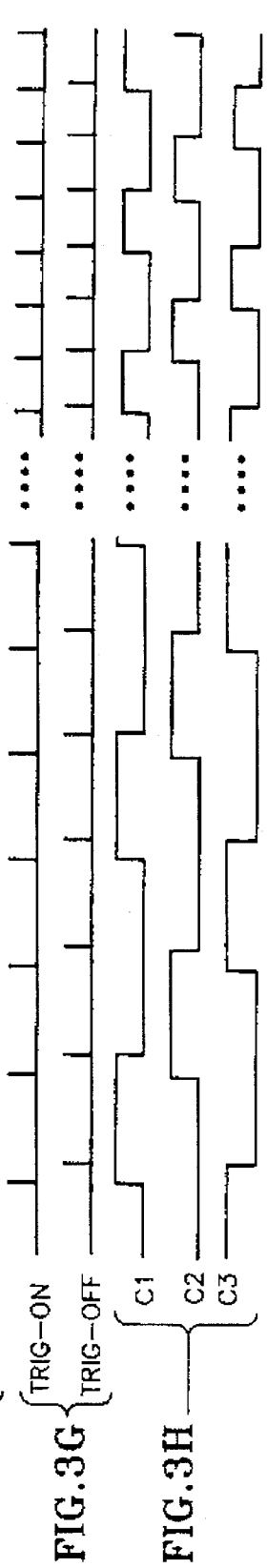
FIG.3A V-BAT
FIG.3B G1, G2, G3
FIG.3C TOGGLE
FIG.3D PULSE
FIG.3E REF-OFF SW REF-ON
FIG.3F CMP-ON, CMP-OFF
FIG.3G TRIG-ON, TRIG-OFF
FIG.3H C1, C2, C3

METHOD AND SYSTEM FOR CONTROLLING A BRUSHLESS ELECTRIC MOTOR FOR OPTIMAL COMMUTATION OVER A WIDE SPEED RANGE

CROSS REFERENCE TO RELATED APPLICATION

This application relates to the following patent application filed on the same date: U.S. application Ser. No. 08/314,994 for A Permanent Magnet Electric Motor Having Reduced Cogging Torque by Sebastiano Acquaviva.

TECHNICAL FIELD

The present invention relates generally to brushless electric motors and, more particularly, to the control of brushless electric motors without conventional rotor position sensors, and further to a device for indicating the angular position, hereafter referred to as an encoder, using the indicated procedure.

Brushless motors are synchronous machines. Information concerning the position of the rotor is necessary for the proper functioning and control of these types of motors. Typically, Hall effect sensors are used in order to indicate the rotor's angular position in which current switching must occur in the motor's phases or windings.

However, in the absence of these position sensors, it is possible to determine the angular position of the rotor by monitoring and analyzing the electromotive forces (EMF) induced in the motor's phases. Using this information, the point or moment of current switching in the phases is determined by known methods without position sensors. In this way, in known prior art control systems, the information supplied about the rotor's angular position in motors without the sensors is imprecise and therefore the switching times are not determinable in an optimal manner and the performance of the motor is adversely impacted.

Moreover, in prior art brushless motors employing sensorless switching techniques, switching typically occurs at fixed rotor angles, independent of rotor speed. Further, the phase switch-off commutation point is the same as the switch-on point for another phase. Switching in such prior art sensorless brushless motors is not controlled in an optimum manner. Additionally, a current undulation in the motor is generated that causes oscillation in the output torque. Further, such brushless motors produce electromagnetic interference.

SUMMARY OF THE INVENTION

It is an object of the present invention to provide a method and system for controlling brushless motors that will allow the optimum angular position of the rotor for commutation to be accurately determined.

In one aspect of the present invention, there is provided a method for controlling the operation of a brushless electric motor of the type having at least two windings or phases, each of the phases being connected in series with a respective switch to form a respective circuit branch between the terminals of a constant voltage source thereby forming a plurality of circuit branches in parallel to each other. In accordance with the control method of the present invention, a plurality of signals is generated, each of which is indicative of the electromotive force developed in a respective one of the phases during operation of the motor, and compared with a predetermined reference value to generate a synchronization logic signal. A control signal indicative of the angular rotor position of the motor is generated using the synchronization signal and compared with a first and a second reference signal to generate respective processing signals for controlling the current flow in each said respective circuit branch. The reference signals may advantageously be varied so as to modify the time of initiating the flow of current and ceasing the flow of current in the respective phases.

In another aspect of the present invention, a control system is provided for controlling the operation of a brushless electric motor of the type having at least two windings or phases, each of the phases being connected in series with a respective switch to form a respective circuit branch between the terminals of a constant voltage source thereby forming a plurality of circuit branches in parallel to each other. In accordance with the control system of the present invention, there are provided means for generating a plurality of signals, each of which is indicative of the electromotive force developed in a respective one of the phases during operation of the motor; first comparator means for comparing each of the electromotive force signals with a predetermined reference value so as to generate synchronization logic signal; a signal processing circuit for receiving the synchronization logic signal and for generating a control signal indicative of the angular rotor position of the motor using the synchronization signal; and second comparator means for comparing the control signal with a first and a second reference signal and generating respective processing signals for controlling the current flow in each said respective circuitry branch. Further, the control system may include means for varying the reference signals so as to modify the time of initiating the flow of current and ceasing the flow of current in the respective phases.

BRIEF DESCRIPTION OF THE DRAWINGS

Further advantages and characteristics of the present invention will become apparent from the following detailed description with reference to the accompanying drawings wherein:

FIGS. 3A–3H show is a schematic representation of the variation with time of selected system signals during typical operation of the control system of FIG. 2 in accordance with the present invention.

DETAILED DESCRIPTION OF A PREFERRED EMBODIMENT

Figure 1:
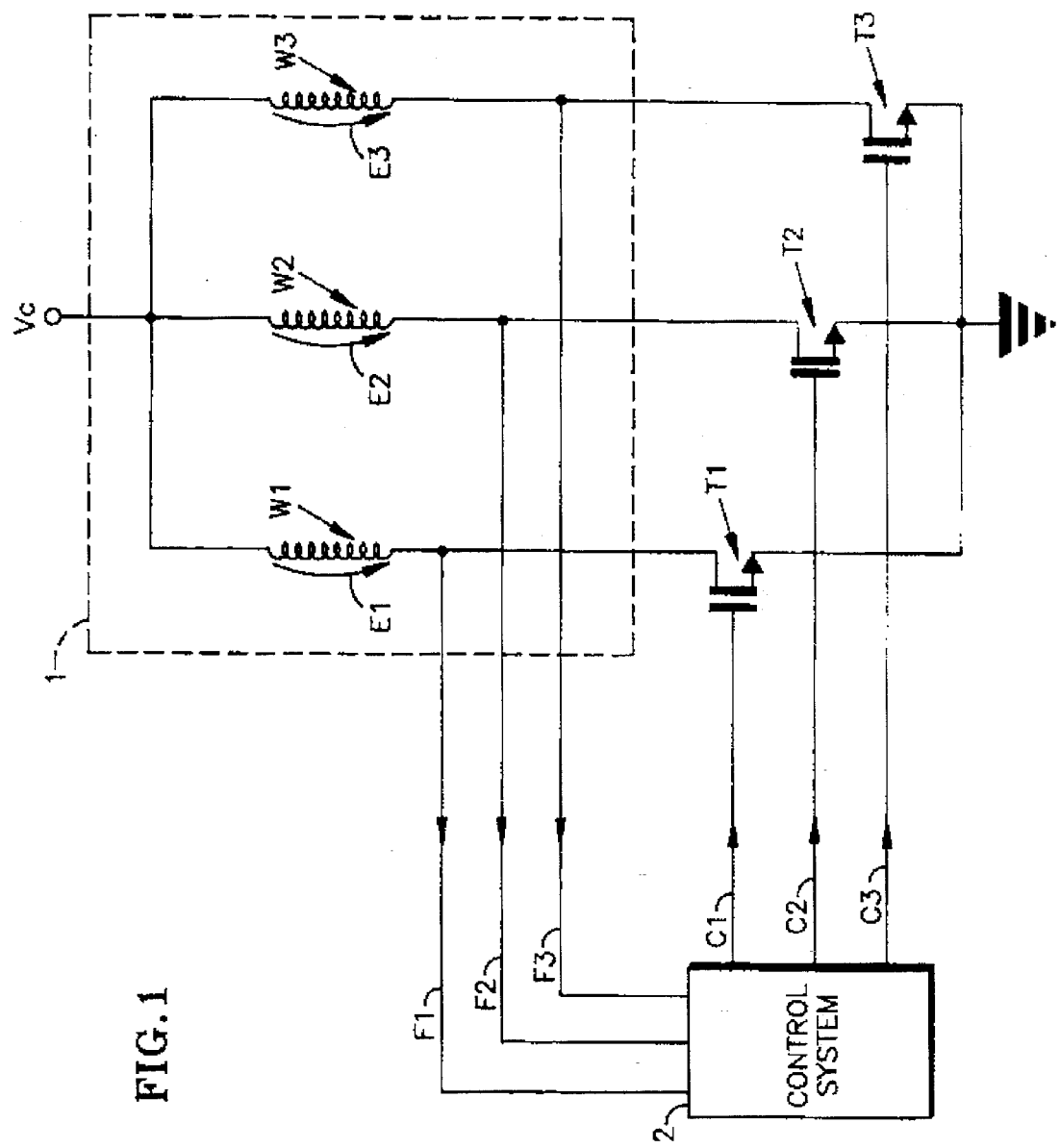
FIG. 1 is a schematic representation of a brushless motor incorporating a control system in accordance with the present invention.

Referring now to FIG. 1, there is depicted schematically a three phase brushless electric motor 1 incorporating a control system 2 in accordance with the present invention. The electric motor 1 includes a rotor (not shown) and a stator with a number of windings or phases W1, W2, W3. However, it is to be understood that the scope of this patent is general and applicable to devices with any number of phases and with any configuration of the control circuit (unipolar, bipolar or other). The phases form part of the circuitry branches placed between the two terminals, Vc and GND, of a constant voltage supply. In addition to the respective phases, these circuit branches include at least one switching element, typically a MOSFET type transistor, shown as T1, T2 and T3, which are functional to render the circuit branch in which it is inserted conductive or non-conductive.

During operation, the transistors T1, T2 and T3, mentioned above, are driven by the control system 2. To function properly, the control system 2 needs information concerning the position of the rotor. Although such information can be extracted from position sensors, in the control system of the present invention, the rotor's position is determined through analysis of the electromotive forces induced in the phases W1, W2, W3. In fact, during operation of motor 1, the signals E1, E2, E3 (FIG. 3A) can be detected in the phases W1, W2 and W3 which are indicative of the electromotive forces induced in the same phases. The control system 2 detects the signals E1, E2, E3 by means of connections F1, F2, F3 that from terminals between phases W1, W2, W3 and transistors T1, T2, T3.

Figure 2:
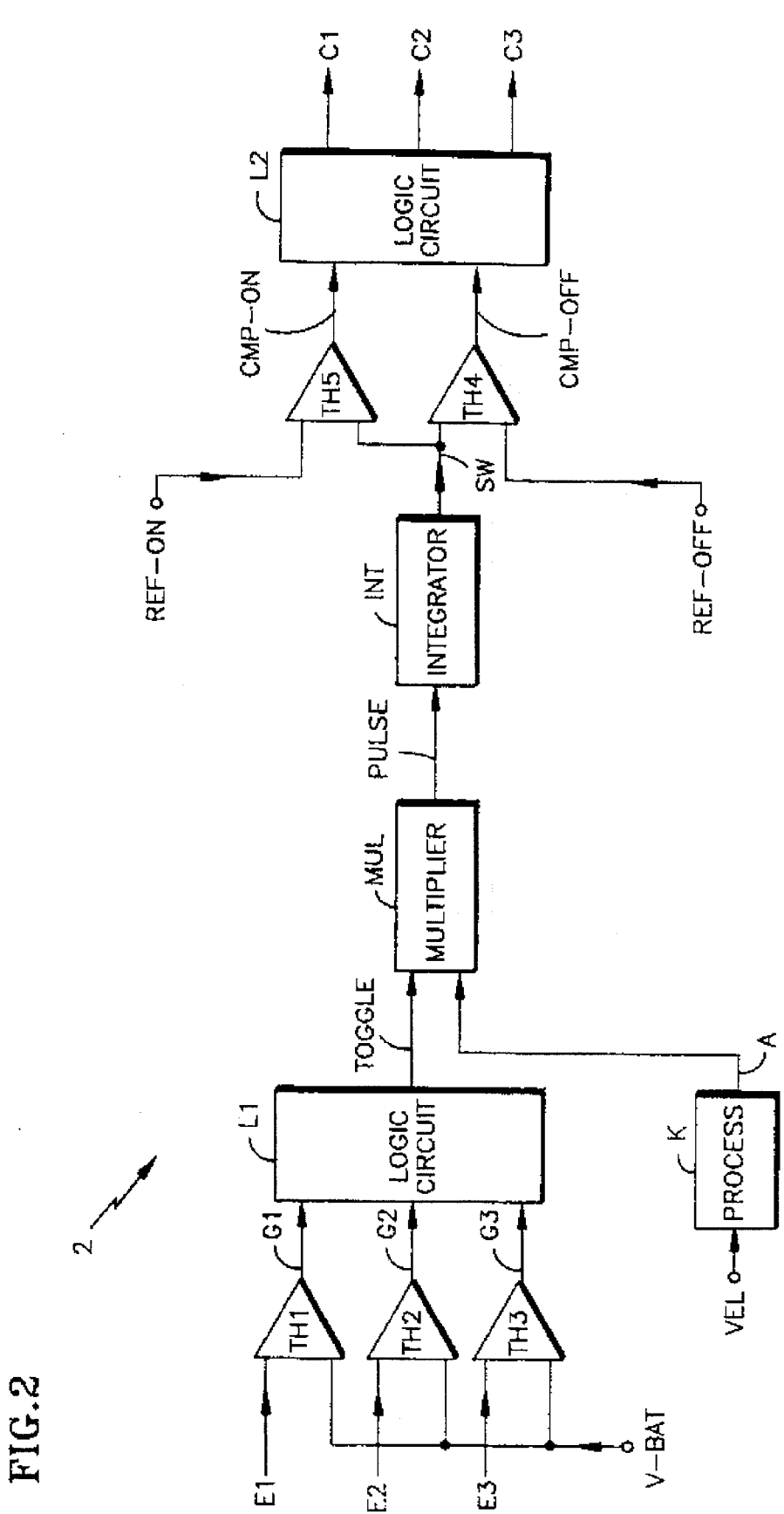
FIG. 2 is a block schematic representation of a control system designed in accordance with the present invention.

Referring now to the block diagram of FIG. 2 and the signals illustrated in FIGS. 3A–3H, the control system 2 consists of three comparators TH1, TH2, TH3, one for each phase W1, W2, W3. These comparators function to compare the signals E1, E2, E3 that are present at the connections F1, F2, F3 with a pre-determined reference value V-BAT advantageously corresponding to the passages through zero of the induced electromotive forces. The result of the comparison is given by three logic signals G1, G2, G3 available at the output of the comparators. All of the signals described hitherto, that is E1, E2, E3, G1, G2, G3 and V-BAT, are illustrated in FIGS. 3A and 3B as functions of time. The right part of each of FIGS. 3A–3H shows signals for a rotor rotation speed that is doubled with respect to the signals shown in the left part of the drawing. All of the signals that are described in the following paragraphs are illustrated in FIG. 3 in a similar manner. The three logic signals G1, G2, G3 are supplied to the input of a logic combinational logic circuit L1. The logic circuit L1 generates a first synchronization logic signal TOGGLE based on the signals G1, G2, G3. The TOGGLE signal has the value of +1 when at least two of the signals G1, G2, G3 have a high logic value, otherwise it has a value of −1. As an alternative, the TOGGLE signal can be generated by adding the signals E1, E2, E3 and comparing the resulting signal using a comparator with a reference value, thus obtaining a square wave signal corresponding to the TOGGLE signal.

A multiplier circuit MUL is connected to the output of logic circuit L1. The function of this multiplier circuit MUL is to multiply the TOGGLE signal coming from the circuit L1 by a factor of scale A. Therefore, a second synchronization logic signal PULSE is available at the output of the multiplier circuit MUL that has the same frequency and the same path as the logic signal TOGGLE, but has amplitude values of +A and −A instead of +1 and −1.

A processing circuit K generates the scale factor A that constitutes the second input of the multiplier circuit MUL from a VEL signal which indicates the rotor's speed. This VEL signal may be generated in known manner using the TOGGLE signal, but preferably is generated from a signal proportional to the upper envelope of the signals E1, E2, E3 indicative of the induced electromotive forces.

The frequency of the second synchronization signal PULSE, which is identical to that of the TOGGLE signal, is equal to 3×p×f (where p is the number of motor pole pairs of motor 1 and f is the rotor's rotation frequency) with a 50% duty-cycle. The circuits K and MUL also operate such that the generated signal PULSE has a mean value of zero over one full cycle, and that over a half-cycle, the value of the area or integral is constant for a varying rotational speed of the rotor.

An integrator INT is connected to the output of the MUL circuit. The purpose of this integrator INT is to integrate the PULSE signal. Given the characteristics of the PULSE signal described above, the control signal SW produced by the integrator INT is a triangular wave signal having a frequency identical to that of the PULSE signal and a peak to peak amplitude that is constant over the speed range. In addition, the instantaneous amplitude of signal SW is indicative of the rotor's position.

The remaining portion of the control system 2 uses the frequency and the position information contained in the SW signal to drive the transistors T1, T2, T3. The remaining portion of the control system consists of two comparators TH4 and TH5 which are designed to compare the control signal SW with the two variable reference signals REF-ON and REF-OFF and a logic circuit L2.

The comparators TH4 and TH5 generate two additional synchronization logic signals CMP-ON and CMP-OFF respectively. The second logic circuit L2 is connected to the output of the two comparators TH4 and TH5 and consists of three outputs connected to driving terminals of transistors T1, T2 and T3. The circuit L2 has, in fact, the task of generating, from the synchronization logic signals CMP-ON and CMP-OFF, the actuation signals C1, C2 and C3 which control the conduction of the transistors T1, T2, T3.

For this purpose, the logic circuit L2 generates two synchronization impulse signals TRIG-ON and TRIG-OFF which indicate a positive impulse in correspondence with the rising fronts of the signals CMP-ON and CMP-OFF respectively. Subsequently, the logic circuit L2 uses the signals CMP-ON and CMP-OFF as well as the signals G1, G2 and G3 that are available inside the control system 2, even if the relative connections at the input of the logic circuit L2 are not shown, for generating the actuation signals C1, C2 and C3 in known manner. These signals have rising and dropping fronts in correspondence with the pulses of the synchronization impulse signals TRIG-ON and TRIG-OFF.

It must be noted that by varying the reference signals REF-ON and REF-OFF, the control system 2 can vary the switching moment to open and/or close the transistors T1, T2, T3, and therefore optimizes the electric motor 1 as a function of one or more predetermined parameters, such as speed, current, etc.

Through application of the method and system of the present invention, it is possible to activate, that is render conductive, one phase before the conduction period of the preceding phase ends. In this way, the current passes simultaneously in two phases for a brief period of time during switching. This limited overlapping has the advantage that if it is controlled in a suitable manner, it will reduce the oscillation of the absorbed current, the undulation of the torque and the electromagnetic interference that is emitted. The reduction of torque oscillation also permits the reduction of acoustic noise emitted by the motor. Likewise, reduction of oscillation in the absorbed currents will allow the electrical noise produced by the motor to be reduced and minimize the need to use dimensional filters. Moreover, the switching points can be regulated inside the electronic control system in order to optimize the motor's performance. For unipolar power systems, in which it is not possible to have negative voltage values, the PULSE signal will not have a value less than zero. Then, the integrator INT will be given a positive integration terminal and a negative integration terminal, selecting one or the other according to the value of the TOGGLE signal (1 or 0).

Using an alternative technique based on the present invention, it is possible to create an encoder if the windings W1, W2 and W3 do not energize. In such case, the transistors T1, T2, T3, the comparators TH4, TH5 and logic circuit L2 are not present. The position information is provided by the control signal SW.

What is claimed is:

1. A method for controlling the operation of a brushless electric motor having at least two phase windings, each of the phase windings being connected in a respective circuit branch between the terminals of a constant voltage source, the method comprising the steps of:

generating a plurality of signals in which each signal is indicative of the electromotive force developed in a respective one of the phase windings during operation of the motor;

comparing each of the electromotive force signals with a predetermined reference value to generate a synchronization logic signal;

generating a control signal indicative of angular rotor position using the synchronization signal, the control signal having a peak-to-peak amplitude that is constant with rotor speed; and comparing the control signal with first and second reference signals for generating motor actuation signals that control current flows in the respective circuit branches, the first and second reference signals being varied as a function of rotor speed to provide optimal commutation of the electric motor over a wide speed range.

2. The control method as recited in claim 1, wherein the step of comparing the control signal includes the step of:

further varying the first and second reference signals to modify the switching times of the current flows in the respective phase windings in order to reduce torque oscillation in the electric motor.

3. A control system for controlling the operation of a brushless electric motor having at least two phase windings, each of the phase windings being connected in series with a respective switch to form a respective circuit branch between the terminals of a constant voltage source thereby forming a plurality of said circuit branches in parallel with each other, the control system comprising:

means for generating a plurality of signals in which each signal is indicative of the electromotive force developed in a respective one of the phase windings during operation of the motor;

first comparator means for comparing each of the electromotive force signals with a predetermined reference value to generate a synchronization logic signal;

a signal processing circuit for generating a control signal indicative of angular rotor position using the synchronization signal, the control signal having a peak-to-peak amplitude that is constant with rotor speed; and second comparator means for comparing the control signal with first and second reference signals and generating motor actuation signals that control current flows in the respective circuit branches, the first and second reference signals being varied as a function of rotor speed to provide optimal commutation of the electric motor over a wide speed range.

4. The control system as recited in claim 3, and further comprising:

means for further varying the first and second reference signals to modify the switching times of the current flows in the respective phase windings in order to reduce torque oscillation in the electric motor.

5. The control method as recited in claim 1, wherein the step of generating a control signal includes the steps of:

scaling the synchronization signal as a function of rotor speed to provide a digital pulse train with each digital pulse having a half-cycle area that is constant with rotor speed; and integrating the scaled synchronization signal to provide a control signal having a peak-to-peak amplitude that is constant with rotor speed and having an amplitude that is proportional to rotor position and independent of rotor speed.

6. The control system as recited in claim 3, wherein the signal processing circuit includes:

means for scaling the synchronization signal as a function of rotor speed to provide a digital pulse train with each digital pulse having a half-cycle area that is constant with rotor speed; and means for integrating the scaled synchronization signal to provide a control signal having a peak-to-peak amplitude that is constant with rotor speed and having an amplitude that is proportional to rotor position and independent of rotor speed.

* * * * *